United States Patent [19]
Kawai et al.

[11] Patent Number: 5,927,786
[45] Date of Patent: Jul. 27, 1999

[54] CAR BODY STRUCTURE

[75] Inventors: Akira Kawai; Motoru Komatsu; Satoru Ichikawa; Tetsuo Maki, all of Kanagawa-ken, Japan

[73] Assignee: Nissan Motor Co., Ltd., Yokohama, Japan

[21] Appl. No.: 08/800,170

[22] Filed: Feb. 13, 1997

[30]   Foreign Application Priority Data

| Feb. 19, 1996 | [JP] | Japan | 8-030869 |
| Feb. 19, 1996 | [JP] | Japan | 8-030874 |
| Feb. 20, 1996 | [JP] | Japan | 8-032303 |
| Mar. 12, 1996 | [JP] | Japan | 8-054918 |

[51] Int. Cl.$^6$ .................................................. B60R 21/02
[52] U.S. Cl. ................................ 296/39.1; 296/203.03
[58] Field of Search ........................... 296/39.1, 189, 296/203.01, 203.03; 280/748, 751

[56]   References Cited

U.S. PATENT DOCUMENTS 5,458,393  10/1995  Benedyk ............................... 296/205
5,609,385  3/1997  Daniel et al. .......................... 296/188
5,641,195  6/1997  Patel et al. ............................ 296/189
5,660,426  8/1997  Sugimori et al. ..................... 296/39.1
5,725,271  3/1998  Patel et al. ............................ 296/189

FOREIGN PATENT DOCUMENTS 4015375  11/1991  Germany ............................ 280/751
406072153  3/1994  Japan ................................... 296/189

*Primary Examiner*—Dennis H. Pedder
*Attorney, Agent, or Firm*—Foley & Lardner

[57]   ABSTRACT

A car body structure comprises a pillar panel, and a pillar garnish molding made of synthetic resin and fitted to the pillar panel on the cabin side. The pillar garnish molding has a closed section which is enclosed by a base portion facing the pillar panel a plurality of ribs formed upright on the surface of the base portion and formed at a distance along the longitudinal direction of the pillar panel, and a cover member formed to cover the ribs. Therefore the car body structure is capable of achieving good energy absorption efficiency of head impact deceleration even if the width of the pillar panel is small.

2 Claims, 16 Drawing Sheets

HEAD IMPART DECELERATION G

TIME T

CAR BODY STRUCTURE

BACKGROUND OF THE INVENTION

The present invention relates to a car body structure and, more particularly, structures of a pillar panel and a pillar garnish molding for the car.

As the car body structure, especially, the structure for pillar panels of the car and pillar garnish moldings fitted to the pillar panels in the related art, for example, a structure has been set forth in Patent Application Publication (KOKAI) 7-117596.

By way of example, in the lateral sectional structure of the center pillar of the car, peripheral portions of a center pillar outer panel and peripheral portions of a center pillar inner panel are jointed together such that the center pillar outer panel and the center pillar inner panel constitute a closed sectional structure. A center pillar garnish molding made of synthetic resin is fitted to the center pillar inner panel, i.e., to the cabin side.

The center pillar garnish molding consists of a molding main body which has a substantially U-shaped sectional shape and extends along the center pillar, and a plurality of needle type narrow ribs which are formed on a rear surface of the molding main body, i.e., on the center pillar inner panel side of the center pillar to have two kinds of, i.e., high and low projection height respectively. Longitudinal side edges of the molding main body are fitted into lips of a joint edge welt positioned on the center pillar side.

The narrow ribs are formed at a predetermined angle with the direction perpendicular to the surface of the molding main body so as to incline toward the same direction. The narrow ribs with high projection height and the narrow ribs with low projection height are formed alternatively.

In such structure, if a pressing impact load in excess of a predetermined value is applied with some cause from the cabin side to the molding main body of the center pillar garnish molding, then the high narrow ribs of the center pillar garnish molding are pushed against the surface of the center pillar inner panel of the center pillar. As shown in FIG. 30, a first impact absorption pattern (a) is generated by inclined deformation (deflection) of the high narrow ribs in compliance with supporting elasticity at a predetermined level. Subsequently, if the high narrow ribs are further deformed to cause deflection more than a predetermined level in the same direction, then a second impact absorption pattern (b) is generated by deflection of the low narrow ribs in compliance with supporting elasticity at another predetermined level. In this manner, these two impact absorption patterns (a) and (b) are continuously generated and synergistically combined so as to absorb the pressing impact load as soon as possible.

However, in the related art, the pressing impact load which is applied from the cabin side to the molding main body of the center pillar garnish molding and exceeds the predetermined value is absorbed by inclined deformation (deflection) of the narrow ribs of the center pillar garnish molding. Therefore, if the inner surface of the molding main body is pushed against the surface of the center pillar inner panel of the center pillar when the narrow ribs yield to the load completely, then absorption of the pressing impact load is ceased.

In order to increase an absorption level of the pressing impact load, a sufficient distance is required between the surface of the molding main body of the center pillar garnish molding and the surface of the center pillar inner panel of the center pillar.

In other words, since the surface of the molding main body of the center pillar garnish molding is pushed out into the cabin rather than the surface of the center pillar inner panel of the center pillar, the driver or passenger in the cabin are likely to feel sense of oppression.

Further, upon getting on and off the car, the driver or passenger's foot, etc. may run against the surface of the molding main body of the center pillar garnish molding which being pushed out into the cabin.

Still further, when the driver or passenger in the cabin see the outside of the car, field of view may be obstructed by the surface of the molding main body of the center pillar garnish molding which being pushed out into the cabin. Therefore, improvement in such structure is expected.

SUMMARY OF THE INVENTION

Therefore, the present invention has been made in the light of the above circumstances, and it is an object of the present invention to provide a car body structure capable of improving energy absorption efficiency in head impact deceleration even if the dimension of a width of the pillar panel is small.

In order to overcome the above problems, according to an aspect of the present invention, there is provided a car body structure comprising:

a pillar panel; and a pillar garnish molding made of synthetic resin and fitted to a cabin side of said pillar panel; and wherein said pillar garnish molding has a closed section enclosed by a base portion, a plurality of ribs, and a cover member, said base portion is arranged in opposition to said pillar panel said plurality of ribs are set uprightly on a surface of said base portion, said ribs separated by spaces in a longitudinal direction of said pillar panel, and said cover member covers said ribs.

According to the above aspect, if a pressing impact load in excess of a predetermined value is applied to the pillar garnish molding from the cabin side, an initial reaction is first generated by the ribs in response to the pressing impact load. Then, buckling indicated of the cover member and the ribs are then caused, so that, the initial reaction is reduced. However, reaction indicated is generated by the closed portion, subsequently, an energy absorption stroke is secured until the base portion is shifted to collide with the pillar panel while the cover member and the ribs of the pillar garnish molding are buckled. For this reason, energy absorption efficiency of head impact deceleration can be remarkably improved.

In addition, such a car body structure can be provided that a dimension of width of the center pillar may be reduced since a large stroke is not required for impact energy absorption.

Further, a pressing impact load resistant value can be controlled as a design value by adjusting an interval between the ribs.

In the first preferred embodiment, said base portion, said ribs, and said cover member are formed as one body, a thin hinge, allowing an open-close action, is formed between respective one end portions of said base portion and said cover member, respective the other end portions of said base portion and said cover member are fixed each other.

According to this first preferred embodiment, since the base portion, the ribs, and the cover member are formed as one body, the pillar garnish molding can become cheap in formability and a pressing impact load resistant value can be stable.

Further, the pillar garnish molding can be formed as the cover member is opened. Therefor, the pillar garnish molding can become easy in formability, and a die for the pillar garnish molding can became cheap.

In the second preferred embodiment, said ribs have a substantially semicylindrical sectional shape.

According to this second preferred embodiment, if a pressing impact load is applied from the cabin side to the pillar garnish molding, then an initial reaction by the ribs in response to the pressing impact load can be increased.

According to another aspect of the present invention, there is provided a car body structure comprising:

a pillar panel consisting of outer panel and inner panel; and a pillar garnish molding made of synthetic resin and fitted to a cabin side of said pillar panel; and wherein said inner panel has a projection portion which may tear said pillar garnish molding as a pressing impact load is applied to said pillar garnish molding.

According to the above aspect, if a pressing impact load in excess of a predetermined value is applied to the pillar garnish molding from the cabin side, the pillar garnish molding is shifted by the pressing impact load to collide with the inner panel of the pillar panel. At this time, since the pillar garnish molding is torn on the projection portion of the inner panel, energy absorption efficiency of head impact deceleration can be remarkably improved.

In addition, since there is no necessity of large stroke to absorb impact energy, a car body structure can be provided in which a width of the pillar panel is made small.

In the third preferred embodiment, said pillar garnish molding has a rib, said rib is projected from a surface of said pillar garnish molding faced to said inner panel, and said rib has thin portion arranged in opposition to said projection portion.

According to this third preferred embodiment, if a pressing impact load in excess of a predetermined value is applied to the pillar garnish molding, the ribs of the pillar garnish molding collide with the projection of the inner panel of the pillar panel. In this event, since the pillar garnish molding is torn by breaking out the thin portions of the ribs as starting points, energy absorption efficiency of head impact deceleration can be remarkably improved.

In the fourth preferred embodiment, said projection portion is formed at a corner of said inner panel.

According to this fourth preferred embodiment, the projection portions of the inner panel of the pillar panel can become easy in formability.

According to another aspect of the present invention, there is provided a car body structure comprising:

a pillar panel; and a pillar garnish molding made of synthetic resin and fitted to a cabin side of said pillar panel; and wherein said pillar garnish molding comprises a molding main body and a plurality of ribs, said molding main body is arranged in opposition to said pillar panel said plurality of ribs are separated by spaces in a longitudinal direction, said ribs set uprightly on a surface of said molding main body, each of said ribs has foot portion at a free edge thereof, and said foot portion is in contact with a surface of said pillar panel and positioned out of an axis of said rib.

In the above another aspect, if a pressing impact load in excess of a predetermined value is applied to the pillar garnish molding from the cabin side, initial reaction is first caused by the ribs in response to the pressing impact load, then the initial load is attenuated since the ribs are bent about their feet, and then reaction is again caused because the molding main body collides with the pillar panel. As a result, energy absorption efficiency of head impact deceleration can be significantly improved.

In addition, since a large stroke is not needed to absorb impact energy, a car body structure can be provided in which a width of the pillar panel is made small.

Furthermore, a pressing impact load resistant value can be controlled as a design value by adjusting a distance between the ribs.

In the fifth preferred embodiment, said foot portion is positioned on one side of said axis.

According to the fifth preferred embodiment, feet of the ribs slide on the surface of the pillar panel if load is applied to the molding main body of the pillar garnish molding. Therefore, since the ribs can be bent to tightly contact the surface of the pillar panel a crushing stroke can be sufficiently assured.

According to still another aspect of the present invention, there is provided a car body structure comprising:

a pillar panel having a cabin opposing surface portion and vertical side surface portions, said cabin opposing surface portion arranged in opposition to a cabin, said vertical side surface portions connected to said opposing surface portion via corner portions at a substantially right angle respectively; and a pillar garnish molding made of synthetic resin and fitted to a cabin side of said pillar panel; and wherein said pillar garnish molding comprises a molding main body and a plurality of ribs, said molding main body is arranged in opposition to said pillar panel, said plurality of ribs are separated by spaces in a longitudinal direction of said molding main body, said ribs set uprightly on a surface of said molding main body, and each of said ribs has a free edge portion, and said free edge portion is arranged in opposition to said corner portions so as to come in contact with said corner portion.

According to the above still another aspect, if a pressing impact load in excess of a predetermined value is applied to the pillar garnish molding from the cabin side, the pillar garnish molding is shifted by the pressing impact load to collide with the pillar panel. At this time, since the free edge portion of the ribs are spread according to the corner portion of the pillar panel and slide on the vertical side surface portions, energy absorption efficiency of head impact deceleration can be remarkably improved.

In addition, since there is no necessity of large stroke to absorb impact energy, a car body structure can be provided in which a width of the pillar panel is made small.

In the sixth preferred embodiment, said plurality of ribs are formed so that a distance between said free edge portions is narrowed rather than a distance between base portions positioned on a molding main body side of said ribs.

According to the above sixth preferred embodiment, if a pressing impact load in excess of a predetermined value is applied to the surface of the pillar garnish molding, then the ribs of the pillar garnish molding collides with the pillar panel. At this time, since the ribs of the pillar panel receive load, initial load may be increased quickly.

In the seventh preferred embodiment, said plurality of ribs are formed between said corner portions connecting said cabin opposing surface portion and said vertical side surface portions.

According to the above seventh preferred embodiment, if the pillar garnish molding is hit from either side, the pressing impact load can be absorbed.

Other and further objects and features of the present invention will become obvious upon an understanding of the illustrative embodiments about to be described in connection with the accompanying drawings or will be indicated in the appended claims, and various advantages not referred to herein occur to one skilled in the art upon employing of the invention in practice.

DETAILED DESCRIPTION OF THE EMBODIMENTS

Figure 1:
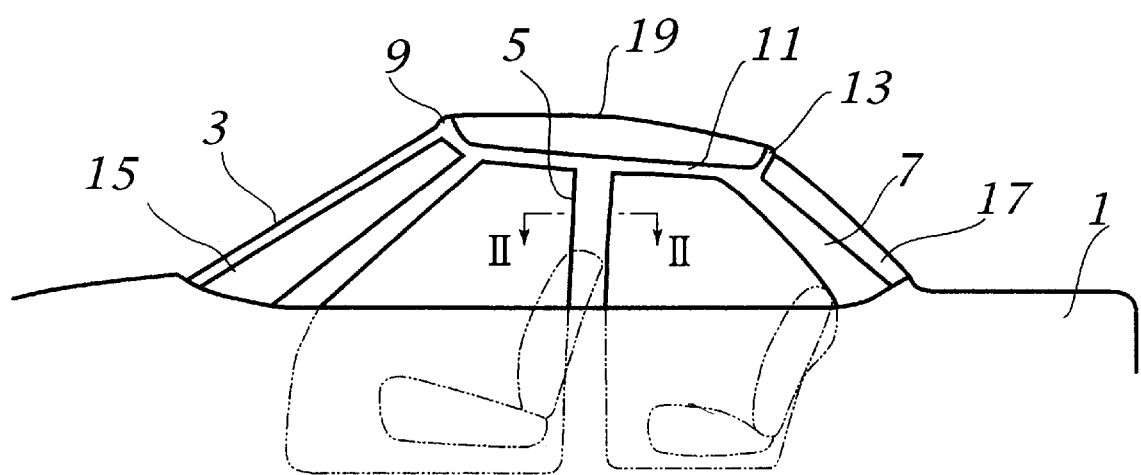
FIG. 1 is a schematic side view showing a car body structure according to the present invention.

Various embodiments of the present invention will be described with reference to the accompanying drawings hereinbelow. It should be noted that the same or similar reference numerals are applied to the same or similar parts and elements throughout the drawings, and the description of the same or similar parts and elements will be omitted or simplified.

(First Embodiment)

Figure 2:
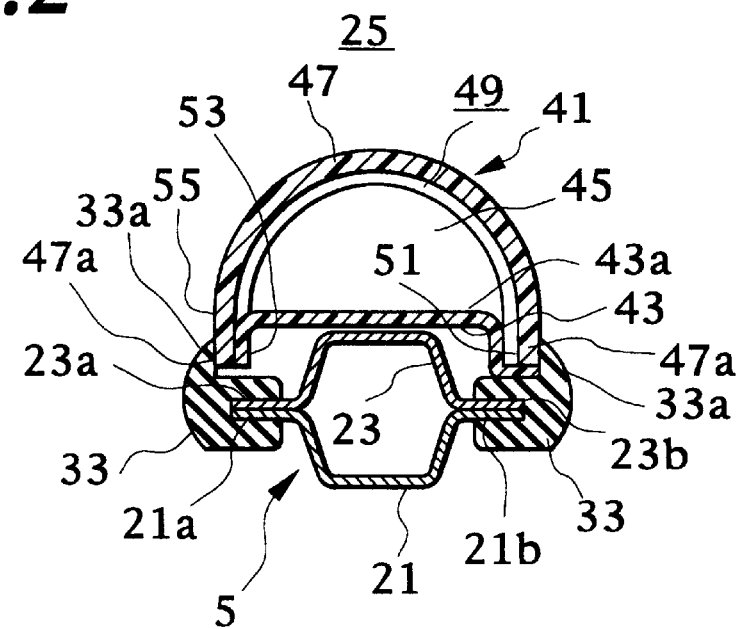
FIG. 2 is a sectional view showing a car body structure according to a first embodiment of the present invention.
Figure 3:
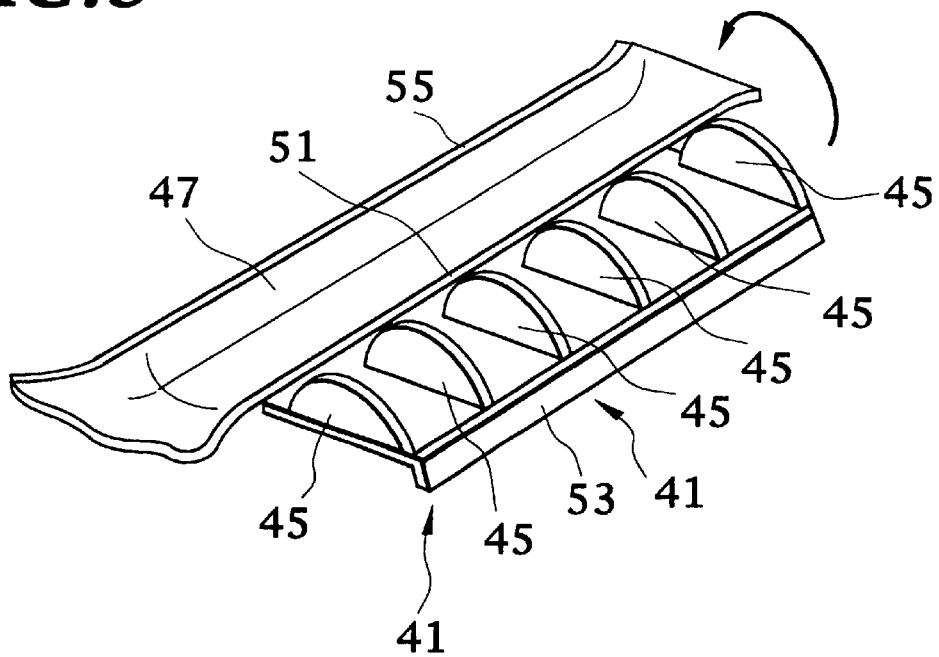
FIG. 3 is a perspective view, taken along a line II—II, showing a structure of a pillar garnish molding in FIG. 2 a cover portion of which being opened.

FIGS. 1 to 3 show a car body structure according to a first embodiment of the present invention.

As shown in FIG. 1, a car body structure, in particular, an upper car body structure of the car includes a front pillar 3, a center pillar 5, a rear pillar 7, a front roof rail 9, roof side rails 11, and a rear roof rail 13, all being formed as "pillar panel", and further includes a front window panel 15, a rear window panel 17, and a roof panel 19.

It should be noted that second to fifth embodiments described later will also be applied to the same car body structure as described above.

As with the front pillar 3, the center pillar 5, the rear pillar 7, the front roof rail 9, the roof side rails 11, and the rear roof rail 13, all serving as the "pillar panel", for example, peripheral portions 21a, 21b of a center pillar outer panel 21 and peripheral portions 23a, 23b of a center pillar inner panel 23 are jointed together in the lateral sectional structure of the center pillar 5 of the car such that the center pillar outer panel 21 and the center pillar inner panel 23 constitute a closed sectional structure.

As shown in FIG. 2, a center pillar garnish molding 41 made of synthetic resin, for example, and serving as a "pillar garnish molding" is fitted to the center pillar inner panel 23, i.e., to the cabin 25 side.

In the center pillar garnish molding 41, as shown in FIGS. 2 and 3, a closed section 49 comprises a base portion 43 which has a flat plate sectional shape and extends along the center pillar 5, a plurality of ribs 45, 45, . . . which are formed upright in the surface 43a of the base 43 on the cabin 25 side and formed at a distance along the longitudinal direction of the center pillar 5, and a cover member 47 which covers all the ribs 45. Longitudinal side edge portions 47a of the cover member 47 are fitted into lips 33a of a welt 33 which is engaged and supported by jointed edge portions 21a, 21b, 23a, 23b on the center pillar 5 side.

The base portion 43, the ribs 45, and the cover member 47 of the pillar garnish molding 41 are formed as one body. A thin hinge 51 is formed between respective one end portions of the base portion 43 and the cover member 47. The thin hinge 51 allows open-close action of the cover member 47 as desired. Respective other ends 53, 55 of the base portion 43 and the cover member 47 are fixed by thermal deposition.

The ribs 45 of the pillar garnish molding 41 are formed to have a substantially semicylindrical sectional shape.

Figure 4:
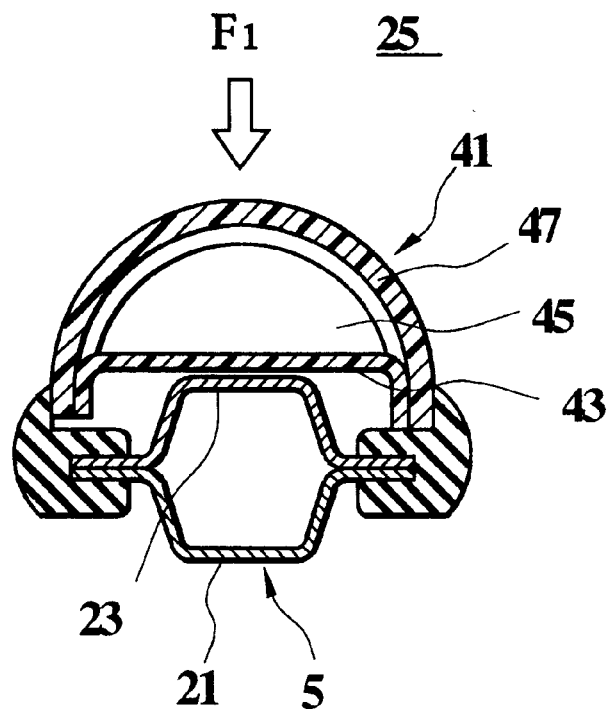
FIG. 4 is a sectional view showing a state wherein a pressing impact load is applied to the pillar garnish molding in FIG. 2.
Figure 5:
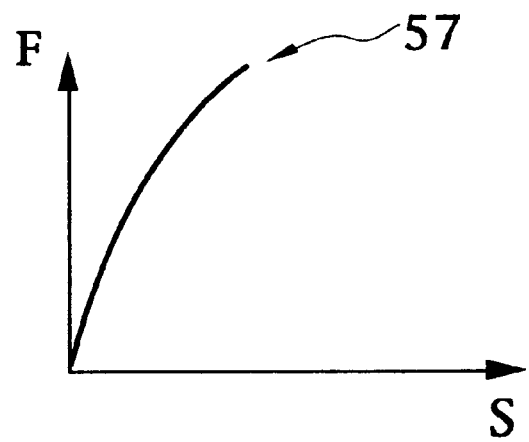
FIG. 5 is a characteristic view showing a correlation between a lapse time after impact has been made on the pillar garnish molding and head impact deceleration in FIG. 4 according to the first embodiment of the present invention.

With the above structure of the first embodiment, as shown in FIG. 4, in the event that the pressing impact load F1 in excess of a predetermined value (e.g., 900 kg if a head weight of the passenger is 4.5 kg and a collision speed is 200 G) is applied to the pillar garnish molding 41 from the cabin 25 side due to secondary collision of the passenger or the like, initial reaction indicated by 57 in FIG. 5 is first generated by the ribs 45 in response to the pressing impact load F1.

Figure 6:
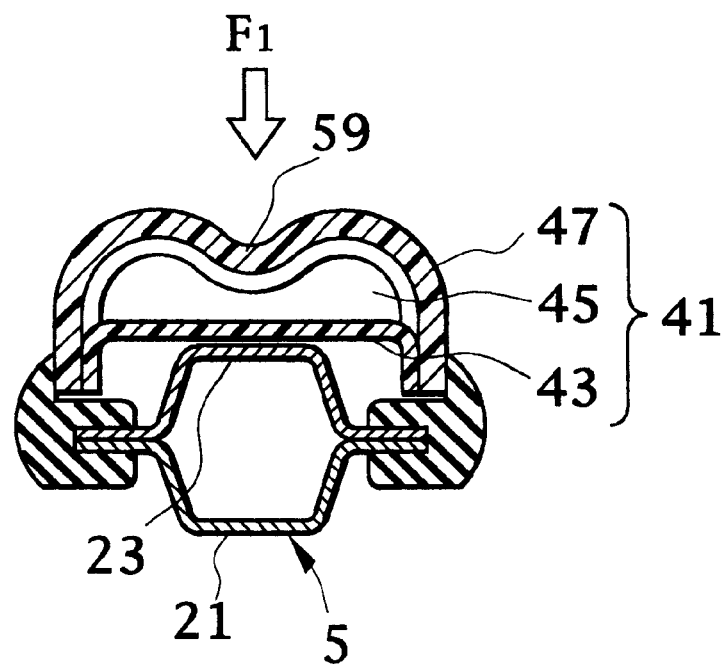
FIG. 6 is a sectional view showing another state wherein the pressing impact load is further applied to the pillar garnish molding from FIG. 4.
Figure 7:
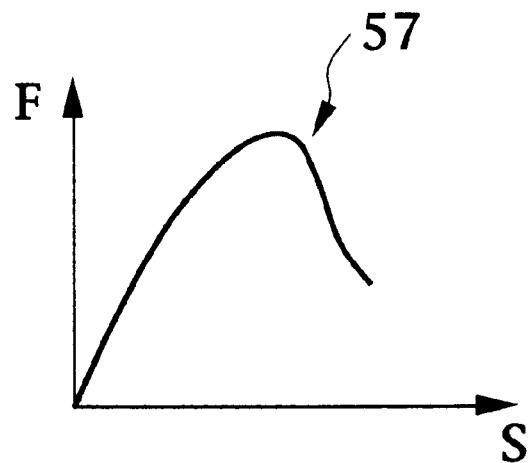
FIG. 7 is a characteristic view showing another correlation between the lapse time after impact has been made on the pillar garnish molding and head impact deceleration in FIG. 6 according to the first embodiment of the present invention.
Figure 8:
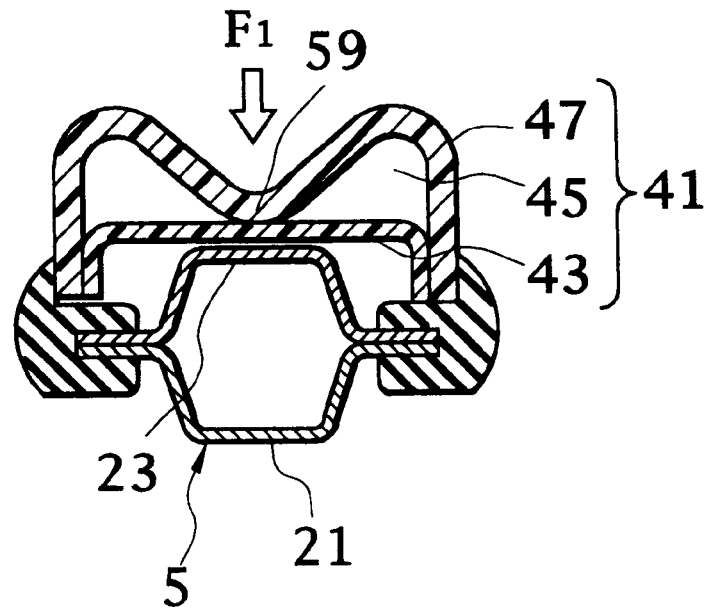
FIG. 8 is a sectional view showing still another state wherein the pressing impact load is further applied to the pillar garnish molding from FIG. 6.

As shown in FIG. 6, buckling indicated by 59 of the cover member 47 and the ribs 45 of the pillar garnish molding 41 are then caused, so that, as shown in FIG. 7, the initial reaction 57 is reduced.

Figure 9:
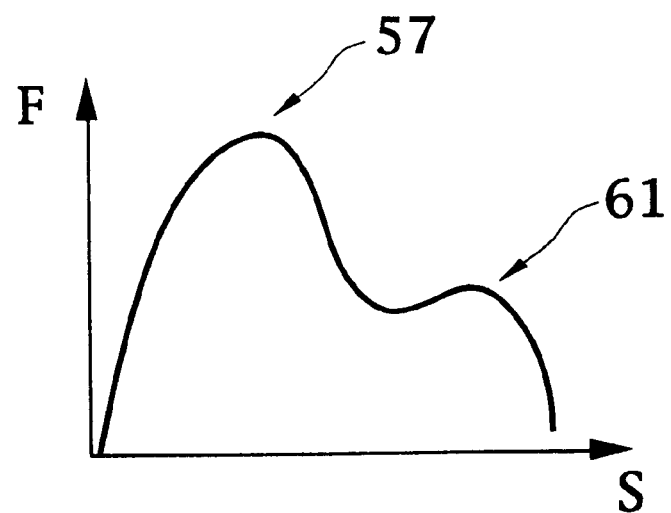
FIG. 9 is a characteristic view showing still another correlation between the lapse time after impact has made on the pillar garnish molding and head impact deceleration in FIG. 8 according to the first embodiment of the present invention.

However, as shown in FIG. 9, reaction indicated by 61 is generated by the closed portion. Subsequently, an energy absorption stroke is secured until the base portion 43 is shifted to collide with the center pillar inner panel 23 of the center pillar 5 while the cover member 47 and the ribs 45 of the pillar garnish molding 41 are buckled. For this reason, energy absorption efficiency of head impact deceleration can be remarkably improved.

In addition, such a car body structure can be provided that a dimension of width of the center pillar 5 may be reduced since a large stroke is not required for impact energy absorption.

Further, a pressing impact load resistant value can be controlled as a design value by adjusting an interval between the ribs 45, 45.

Since the base portion 43, the ribs 45, and the cover member 47 are formed as one body, the pillar garnish molding 41 can become cheap in formability and the pressing impact load resistant value can be stable.

Since the thin hinge 51 allowing an open-close action of the cover member 47 is provided, the pillar garnish molding 41 can be formed as the cover member 47 is opened. Therefor, the pillar garnish molding 41 can become easy in formability, and a die for the pillar garnish molding 41 can became cheap.

Since the ribs 45 have the substantially semicylindrical sectional shape, if a pressing impact load F1 is applied from the cabin 25 side to the pillar garnish molding 41, then the initial reaction by the ribs 45 in response to the pressing impact load F1 can be increased.

As described above, the first embodiment of the present invention can achieve a practical advantage such that the car body structure can be provided which has improved energy absorption efficiency of head impact deceleration and is excellent in formability even if the width of the pillar panel is made small.

The above discussions have been made taking the center pillar as an example, but the "pillar panel" means not only the center pillar panel but also front pillar panel rear pillar panel, front roof rail, side roof rail and rear roof rail in this embodiment of the present invention. This is true of embodiments described in the following.

(Second Embodiment)

Figure 10:
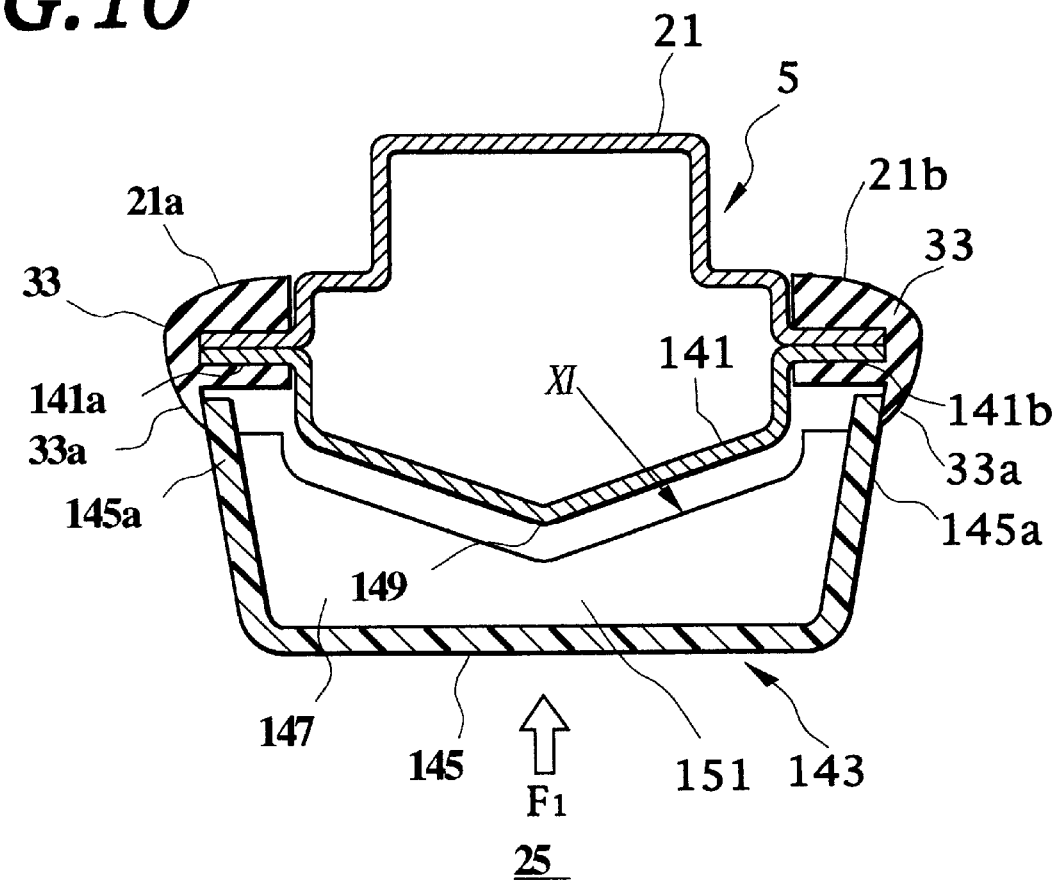
FIG. 10 is a sectional view showing a car body structure according to a second embodiment of the present invention.
Figure 11:
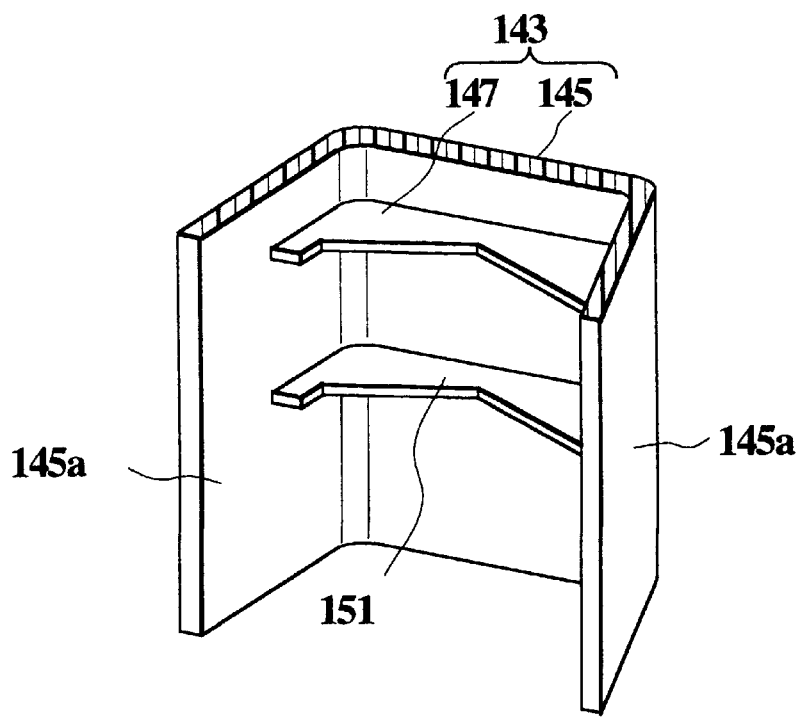
FIG. 11 is a perspective view showing a structure of a center pillar garnish molding in FIG. 10 if viewed from the direction indicated by an arrow XI.

FIGS. 10 and 11 show a car body structure according to a second embodiment of the present invention.

As shown in FIG. 10, for example, peripheral portions 21a, 21b of a center pillar outer panel 21 and peripheral portions 141a, 141b of a center pillar inner panel 141 are jointed together in the lateral sectional structure of the center pillar 5 of the car such that the center pillar outer panel 21 and the center pillar inner panel 141 constitute a closed sectional structure. A center pillar garnish molding 143 made of synthetic resin, for example, and serving as a "pillar garnish molding" is fitted to the center pillar inner panel 141, i.e., to the cabin 25 side.

As shown in FIGS. 10 and 11, the center pillar garnish molding 143 comprises a molding main body 145 which has a substantially U-shaped sectional shape and extends along the center pillar 5, and a plurality of ribs 147, 147, . . . which are formed upright in the back surface of the molding main body 145 toward the center pillar 5, i.e., the center pillar inner panel 141. Longitudinal side edge portions 145a (longitudinal direction of the center pillar garnish molding 143) of the molding main body 145 are fitted into lips 33a of a jointed edge welt 33 on the center pillar 5 side.

A projection portions 149 is formed on a central portion of the center pillar inner panel 141 along the longitudinal direction thereof such that the ribs 147 of the pillar garnish molding 143 may be torn on the projection portion 149 when the pressing impact load F1 is applied to the pillar garnish molding 143 from the cabin 25 side.

A portion of the rib 147 opposing to the projection portion 149 of the center pillar inner panel 141 of the center pillar 5 is formed as a thin portion 151.

With the above structure of the second embodiment, in the event that the pressing impact load F1 in excess of a predetermined value (e.g., 900 kg if a head weight of the passenger is 4.5 kg and a collision speed is 200 G) is applied to the pillar garnish molding 143 from the cabin 25 side because of secondary collision of the passenger and so on, the molding main body 145 of the pillar garnish molding 143 is moved to thus make the plurality of ribs 147, which are formed to project from the back surface of the molding main body 145, i.e., formed vertically on the center pillar 5, collide with the center pillar inner panel 141 of the center pillar 5. At this time, since the ribs 147 of the pillar garnish molding 143 are torn on the projection portion 149 of the center pillar inner panel 141 from the thin potions 151 as a starting point in the lateral direction in FIG. 10 (longitudinal direction of the center pillar 5 of the car), energy absorption efficiency of head impact deceleration G can be significantly improved.

Further, in FIG. 10, a vertical dimension (dimension of a width of the center pillar 5) may be reduced since a large stroke is not needed to absorb impact energy.

Since the projection portion 149 of the center pillar inner panel 141 is formed to have an obtuse angle with the surface of the center pillar inner panel 141, the center pillar inner panel 141 becomes good in formability.

Figure 12:
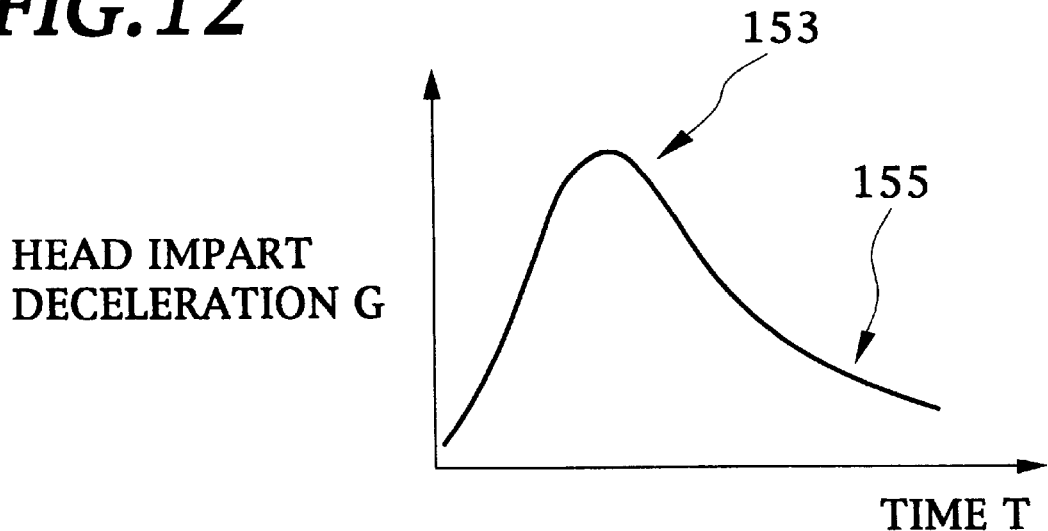
FIG. 12 is a characteristic view showing a correlation between a lapse time after impact has been made on the pillar garnish molding and head impact deceleration according to the second embodiment of the present invention.

Furthermore, the above description will be repeated with reference to FIG. 12 which shows correlation of head impact deceleration G with impact time T. If the pillar garnish molding 143 is moved toward the center pillar inner panel 141 side by the pressing impact load F1 in excess of a predetermined value (e.g., 900 kg if a head weight of the passenger is 4.5 kg and a collision speed is 200 G) to thus collide with the panel 141, then initial load indicated by 153 in FIG. 12 is increased. Subsequently, if the thin portions 151 of the ribs 143 of the pillar garnish molding 43 are torn on the projection portions 149 of the center pillar inner panel 141, then the pressing impact load F1 is unloaded as shown by 155 in FIG. 12 to thus reduce head impact deceleration G.

(Third Embodiment)

Figure 13:
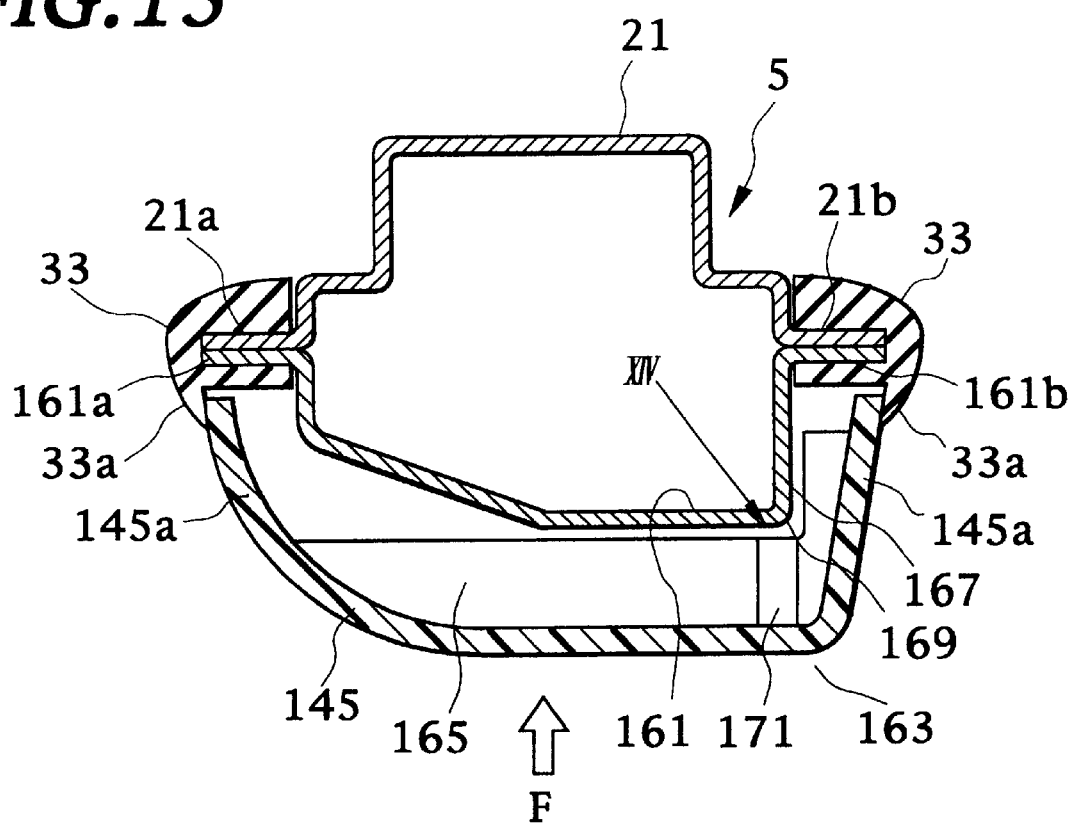
FIG. 13 is a sectional view showing a car body structure according to a third embodiment of the present invention.
Figure 14:
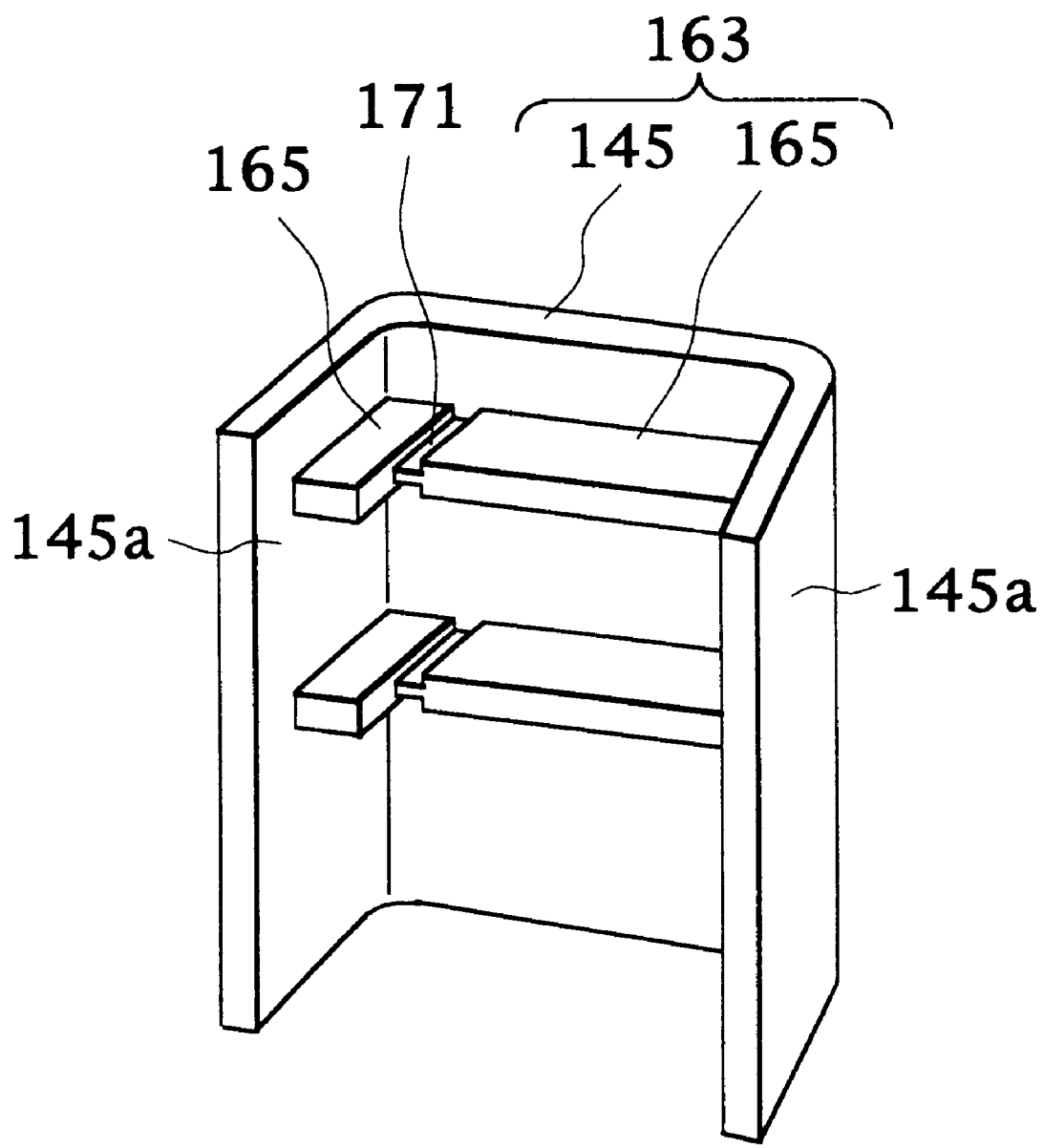
FIG. 14 is a perspective view showing a structure of a center pillar garnish molding in FIG. 13 if viewed from the direction indicated by an arrow XIV.

FIGS. 13 and 14 show a car body structure according to a third embodiment of the present invention. The third embodiment of the present invention is different from the second embodiment of the present invention in that projection portions are formed at locations to improve formability rather than the second embodiment.

As shown in FIG. 13, for example, peripheral portions 21a, 21b of a center pillar outer panel 21 and peripheral portions 161a, 161b of a center pillar inner panel 161 are jointed together in the lateral sectional structure of the center pillar 5 of the car such that the center pillar outer panel 21 and the center pillar inner panel 161 constitute a closed sectional structure. A center pillar garnish molding 163 made of synthetic resin, for instance, and serving as a "pillar garnish molding" is fitted to the center pillar inner panel 161, i.e., to the cabin 25 side.

As shown in FIG. 13, the center pillar garnish molding 163 is made up of a molding main body 145 which has a substantially U-shaped sectional shape and extends along the center pillar 5, and a plurality of ribs 165, 165, . . . which are formed upright in the back surface of the molding main body 145, i.e., formed on the center pillar inner panel 161 side of the center pillar 5 vertically. Longitudinal side edge portions 145a of the molding main body 145 are fitted into lips 33a of a jointed edge welt 33 on the center pillar 5 side.

A projection portion 169 is formed on a corner portion 67 of the center pillar inner panel 161 along the longitudinal direction thereof such that the ribs 165 of the pillar garnish molding 163 may be torn on the projection portion 169 when the pressing impact load F1 is applied to the pillar garnish molding 163 from the cabin 25 side.

A portion of the rib 165 opposing to the projection portion 169 of the center pillar inner panel 161 of the center pillar 5 is formed as a thin portion 171 which makes a plate thickness of the rib 165 thin.

Accordingly, with the above structure of the third embodiment, in the event that the pressing impact load F1 exceeding a predetermined value (e.g., 900 kg if a head weight of the passenger is 4.5 kg and a collision speed is 200 G) is applied to the pillar garnish molding 163 from the cabin 25 side owing to secondary collision of the passenger or the like, the molding main body 145 of the pillar garnish molding 163 is moved by the pressing impact load F1, so that the plurality of ribs 165 which are formed to project from the back surface of the molding main body 145, i.e., formed on the center pillar 5 vertically may collide with the center pillar inner panel 161 of the center pillar 5. At this time, since the ribs 165 of the pillar garnish molding 163 are torn on the projection portion 169 formed on the corner portion 167 of the center pillar inner panel 161 from the thin potions 171 as a starting point in the lateral direction in FIG. 13 (longitudinal direction of the center pillar 5 of the car), energy absorption efficiency of head impact deceleration G can be remarkably improved.

Further, a small dimension may be utilized as a width of the center pillar 5 because a large stroke is not needed to absorb impact energy.

Furthermore, since the projection portion 169 of the center pillar inner panel 161 is formed on the corner portion 167 of the center pillar inner panel 161, the center pillar inner panel 161 can be readily formed.

As discussed earlier, the third embodiment of the present invention can achieve a practical advantage such that the car body structure can be provided which has improved energy absorption efficiency of head impact deceleration and is excellent in formability even if the width of the pillar panel is made small.

(Fourth Embodiment)

Figure 15:
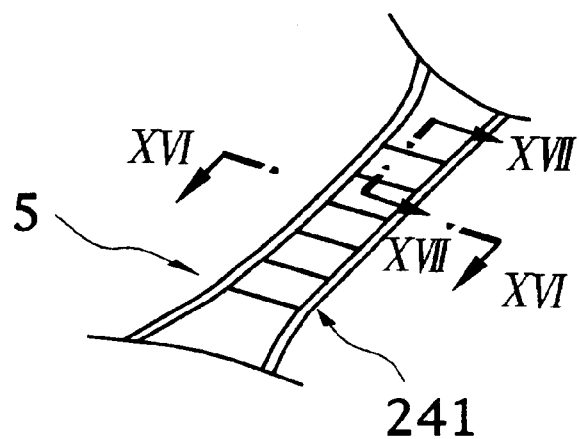
FIG. 15 is a schematic fragmental view showing an upper structure of a car body according to a fourth embodiment of the present invention.
Figure 16:
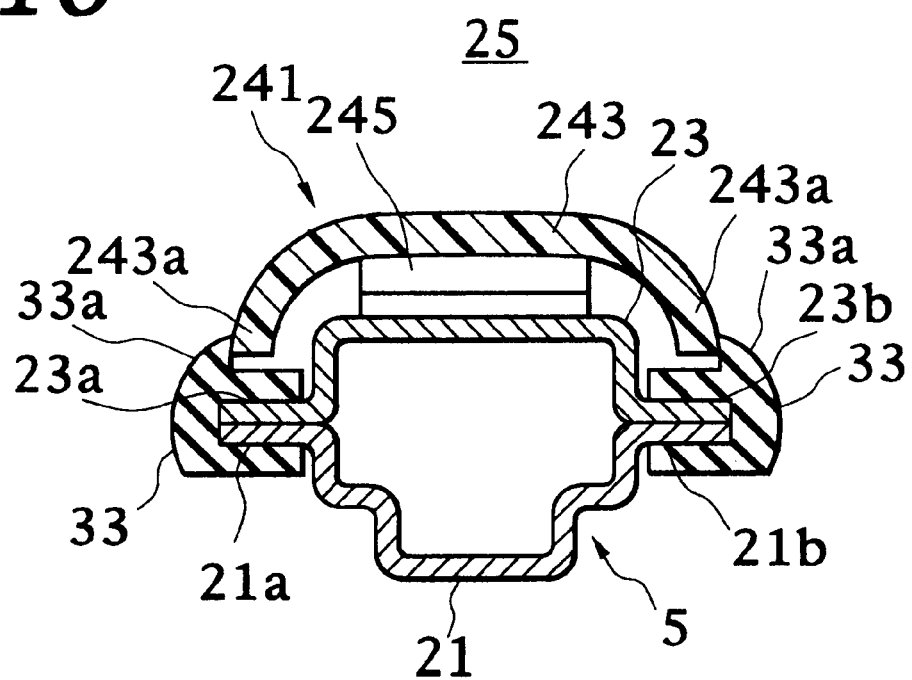
FIG. 16 is a sectional view, taken along a line XVI—XVI in FIG. 15, showing a center pillar and a center pillar garnish molding.

FIGS. 15 and 16 show a car body structure according to a fourth embodiment of the present invention.

As shown in FIGS. 15 and 16, for example, peripheral portions 21a, 21b of a center pillar outer panel 21 and peripheral portions 23a, 23b of a center pillar inner panel 23 are jointed together in the lateral sectional structure of the center pillar 5 of the car such that the center pillar outer panel 21 and the center pillar inner panel 23 constitute a closed sectional structure. A center pillar garnish molding 241 made of synthetic resin, for example, and serving as a "pillar garnish molding" is fitted to the center pillar inner panel 23, i.e., to the cabin 25 side.

Figure 17:
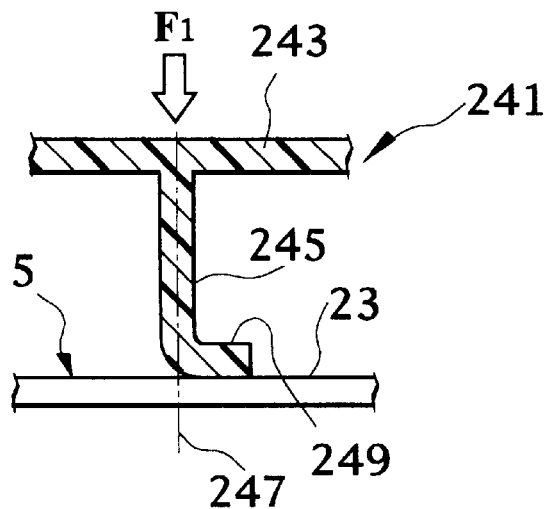
FIG. 17 is a fragmentally enlarged sectional view, taken along a line XVII—XVII in FIG. 15, showing the center pillar garnish molding.

As shown in FIGS. 15 and 16, the center pillar garnish molding 241 comprises a molding main body 243 which opposes to the center pillar inner panel 23 of the center pillar 5, and a plurality of ribs 245, 245, . . . which are formed upright in the surface of the molding main body 243 and spaced apart from each other along the longitudinal direction of the center pillar 5. As shown in FIG. 17, a foot 249 is formed on a free edge of the rib 245 such that it is in contact with the surface of the center pillar inner panel 23 of the center pillar 5 and it is out of an axis 247 of the rib 245 toward one direction only. Longitudinal side edge portions 243a of the molding main body 243 are fitted into lips 33a of a welt 33 which is engaged and supported by jointed edge portions 21a, 21b, 23a, 23b on the center pillar 5 side.

The molding main body 243 and the ribs 245 of the pillar garnish molding 241 are formed as one body. The foot 249 is formed to have an L-shaped sectional shape with respect to the axis 247 of the rib 245.

Figure 18A:
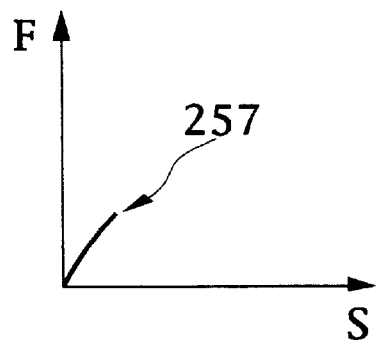
FIG. 18A is a characteristic view showing a correlation between a lapse time after impact has been made on the center pillar garnish molding and head impact deceleration in FIG. 17 according to the fourth embodiment of the present invention.

With the above structure of the fourth embodiment, as shown in FIG. 17, in case the pressing impact load F1 in excess of a predetermined value (e.g., 900 kg if a head weight of the passenger is 4.5 kg and a collision speed is 200 G) is applied to the pillar garnish molding 241 from the cabin 25 side because of secondary collision of the passenger or the like, initial reaction indicated by 257 in FIG. 18A is first generated by the ribs 245 in response to the pressing impact load F1.

Figure 18B:
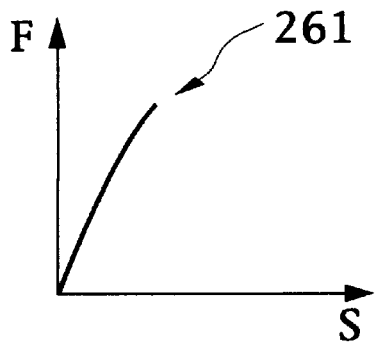
FIG. 18B is a characteristic view showing the correlation between the lapse time after impact has been made further on the center pillar garnish molding from the state in FIG. 18A and head impact deceleration according to the fourth embodiment of the present invention.

Then, as shown in FIG. 18B, reaction indicated by 261 is generated until buckling of the ribs 245 of the pillar garnish molding 241 is caused against the molding main body 243 of the pillar garnish molding 241.

Figure 19:
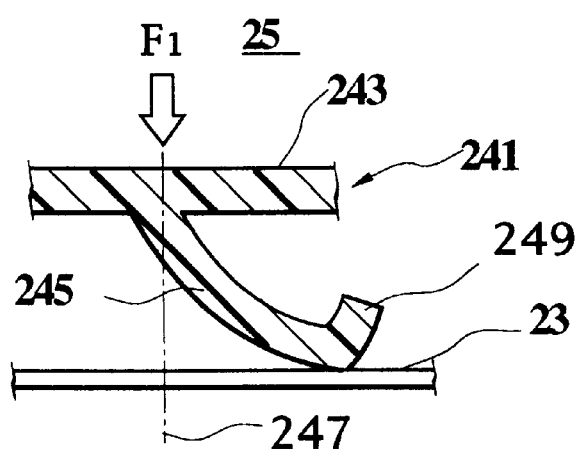
FIG. 19 is a fragmentally enlarged sectional view showing a state wherein ribs of the center pillar garnish molding in FIG. 16 are caused to start buckling from the state shown in FIG. 17 according to the fourth embodiment of the present invention.
Figure 20:
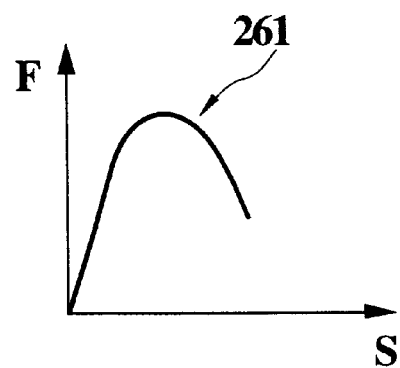
FIG. 20 is a characteristic view showing the correlation between the lapse time after impact has been made further on the center pillar garnish molding from the state in FIG. 19 and head impact deceleration according to the fourth embodiment of the present invention.

If the pressing impact load F1 is further applied, then the feet 249 of the ribs 245 of the pillar garnish molding 241 slide on the surface of the center pillar inner panel 23 of the center pillar 5 such that, as shown in FIG. 19, the feet 249 are moved to be more significantly out of the axis 247, and the ribs 245 are bent about their feet 249. As a result, as shown in FIG. 20, the ribs 245 which being not completely crushed can be reduced and therefore reaction indicated by 261 can be decreased.

Figure 21:
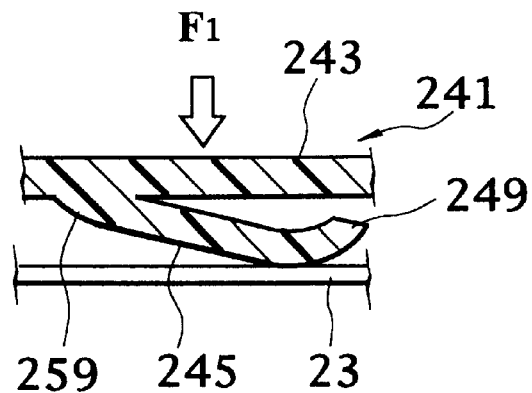
FIG. 21 is a fragmentally enlarged sectional view showing a state wherein ribs of the center pillar garnish molding in FIG. 16 are caused to continue buckling from the state shown in FIG. 19 according to the fourth embodiment of the present invention.
Figure 22:
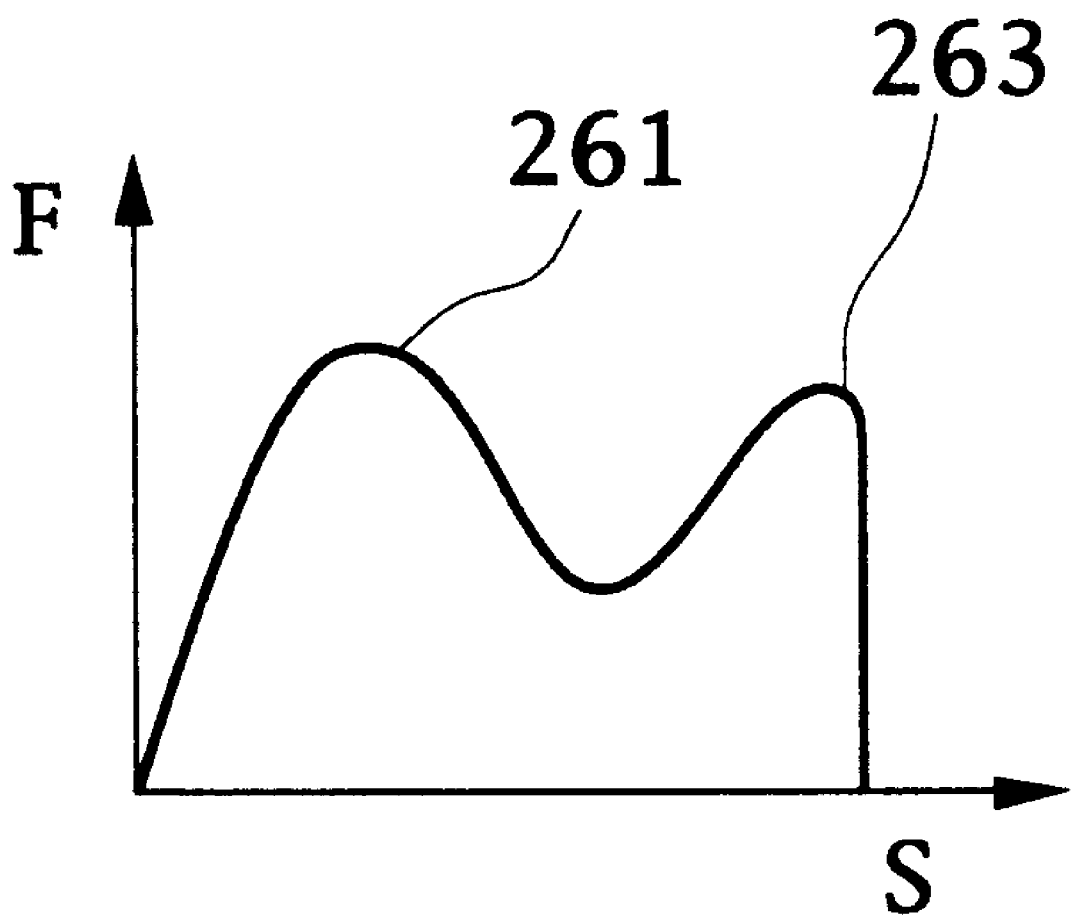
FIG. 22 is a characteristic view showing the correlation between the lapse time after impact has been made still further on the center pillar garnish molding from the state in FIG. 21 and head impact deceleration according to the fourth embodiment of the present invention.

Subsequently, if the pressing impact load F1 is still further applied to the molding main body 243 of the pillar garnish molding 241, then the feet 249 of the ribs 245 slide much more on the surface of the center pillar inner panel 23 of the center pillar 5. For this reason, as shown in FIG. 21, the ribs 245 can be buckled down completely until they come fully into contact with the surface of the center pillar inner panel 23 of the center pillar 5, so that crushing stroke of the ribs 245 can be sufficiently assured. In addition, when the molding main body 243 bumps against the center pillar inner panel 23 of the center pillar 5, reaction indicated by 263 is produced by the center pillar inner panel 223. Therefore, as shown in FIG. 22, two peaks of reaction appear in the energy absorption waveform of head impact deceleration G.

Such a car body structure can be provided that a dimension of width of the center pillar 5 may be reduced since a large stroke is not required for impact energy absorption.

Further, a pressing impact load resistant value can be controlled as a design value by adjusting an interval between the ribs 245, 245.

As described above, the fourth embodiment of the present invention can achieve a practical advantage such that the car body structure can be provided which has improved energy absorption efficiency of head impact deceleration and is excellent in formability even if the width of the pillar panel is made small.

(Fifth Embodiment)

Figure 23:
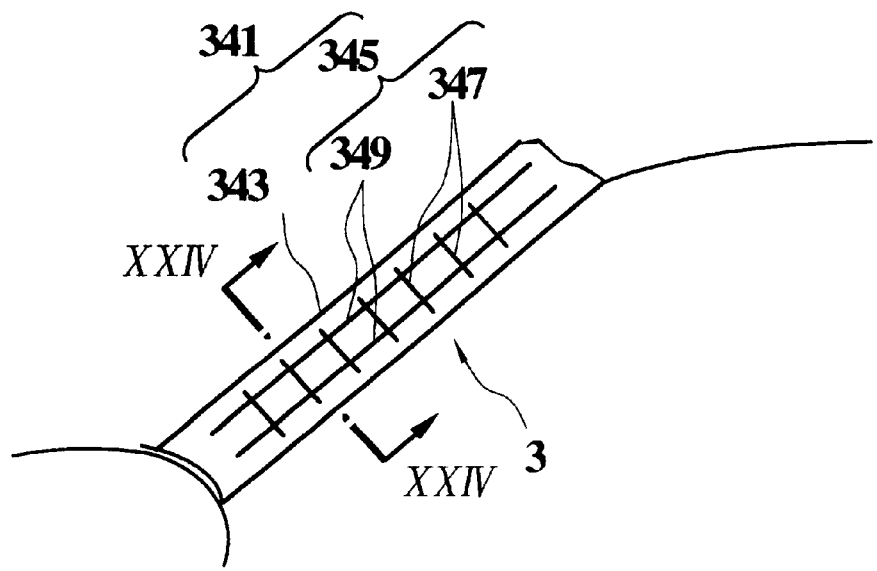
FIG. 23 is a schematic fragmental view showing an upper structure of a car body according to a fifth embodiment of the present invention.
Figure 24:
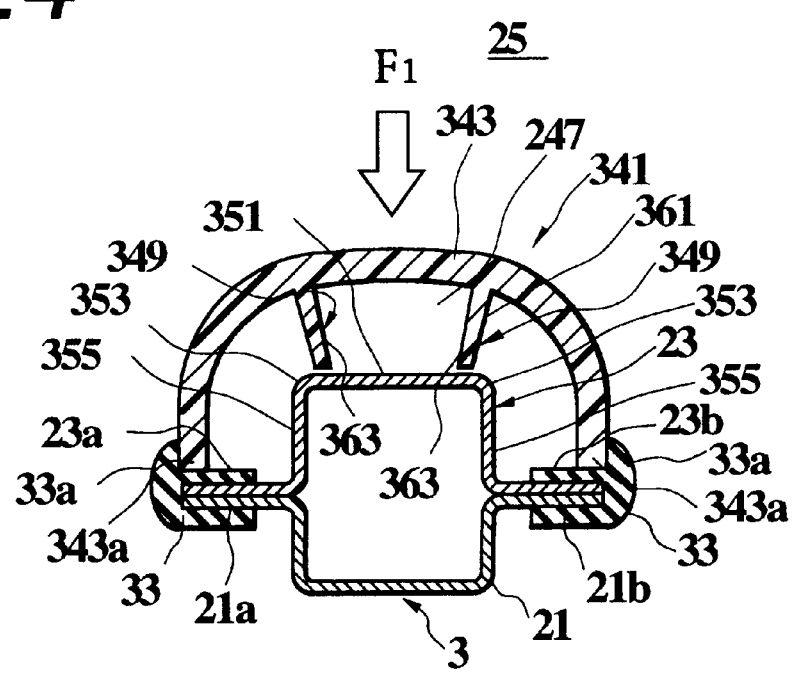
FIG. 24 is a sectional view, taken along a line XXIV—XXIV in FIG. 23, showing a front pillar and a front pillar garnish molding.

FIGS. 23 and 24 show an upper body structure of a car according to a fifth embodiment of the present invention.

As shown in FIG. 24, for example, peripheral portions 21a, 21b of a front pillar outer panel 21 and peripheral portions 23a, 23b of a front pillar inner panel 23 are jointed together in the lateral sectional structure of the front pillar 3 of the car such that the front pillar outer panel 21 and the front pillar inner panel 23 constitute a closed sectional structure. A front pillar garnish molding 341 made of synthetic resin, for example, and serving as a "pillar garnish molding" is fitted to the front pillar inner panel 23, i.e., to the cabin 25 side.

As shown in FIGS. 23 and 24, the front pillar garnish molding 341 comprises a molding main body 343 which extends along the front pillar 3 and has a substantially U-shaped sectional shape, and ribs 345 which are formed on the rear surface of the molding main body 343, i.e., on the front pillar inner panel 23 side of the front pillar 3. Longitudinal "lateral" in FIG. 23) side edge portions 343a of the molding main body 343 are fitted into rear lips 33a of an edge welt 33 which covers jointed edge portions 21a, 21b, 23a, 23b on the front pillar 3 side.

The ribs 345 comprise a plurality of first ribs 347, 347, . . . which are formed to be projected upright from the back surface of the molding main body 343 and spanned between both side edge portions 343a, 343a of the molding main body 343 in the lateral direction and separated intermittently at a distance in the longitudinal direction, and a plurality of second ribs 349, 349, . . . which are formed in parallel with the side edge portions 343a, 343a in the longitudinal direction of the molding main body 343 and separated intermittently at a distance in the lateral direction (lateral direction in FIG. 23).

The front pillar inner panel 23 of the front pillar 3 is formed to have a cabin opposing surface portion 351 which opposes to the cabin 25, and vertical side surface portions 355 which are connected to the cabin opposing surface portion 351 at a substantially right angle via corner portions 353 respectively.

For the second ribs 349 of the ribs 345 of the pillar garnish molding 341, free edge portions 363, 363 are formed so as to oppose to the corner portions 353, 353 of the front pillar inner panel 23, and a lateral distance between the free edge portions 363, 363 is slightly narrowed rather than a lateral distance between base portions 361, 361 of the molding main body 343 so as to contact the corner portions 353, 353 if the molding main body 343 is thrust by the pressing impact load F1.

Figure 25A:
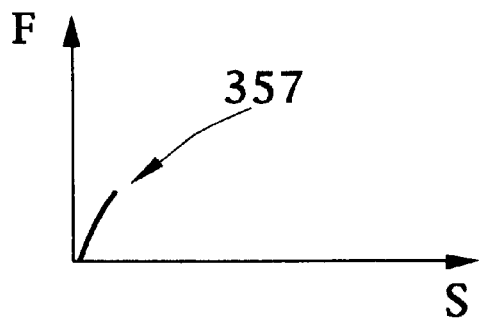
FIG. 25A is a characteristic view showing a correlation between a lapse time after impact has been made on the front pillar garnish molding and head impact deceleration in FIG. 24 according to the fifth embodiment of the present invention.
Figure 25B:
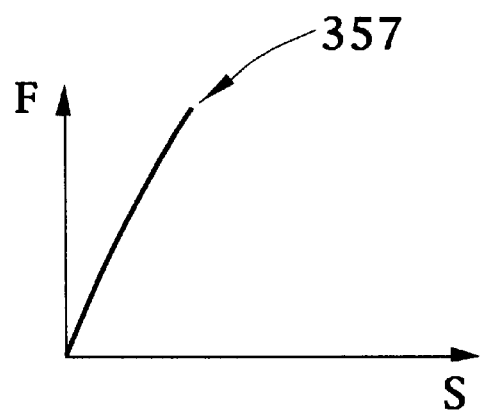
FIG. 25B is a characteristic view showing the correlation between the lapse time after impact has been made further on the front pillar garnish molding from the state in FIG. 25A and head impact deceleration according to the fifth embodiment of the present invention.

With the above structure of the fifth embodiment, as shown in FIG. 24, in case the pressing impact load F1 in excess of a predetermined value (e.g., 900 kg if a head weight of the passenger is 4.5 kg and a collision speed is 200 G) is applied to the pillar garnish molding 341 from the cabin 25 side due to secondary collision of the passenger or the like, initial reaction indicated by 357 in FIGS. 25A and 25B is first generated by the ribs 345 because the free edge portions 363 of the second ribs 349 collide with the corner portions 353 of the front pillar inner panel 23 of the front pillar 3 in response to the pressing impact load F1.

Figure 26:
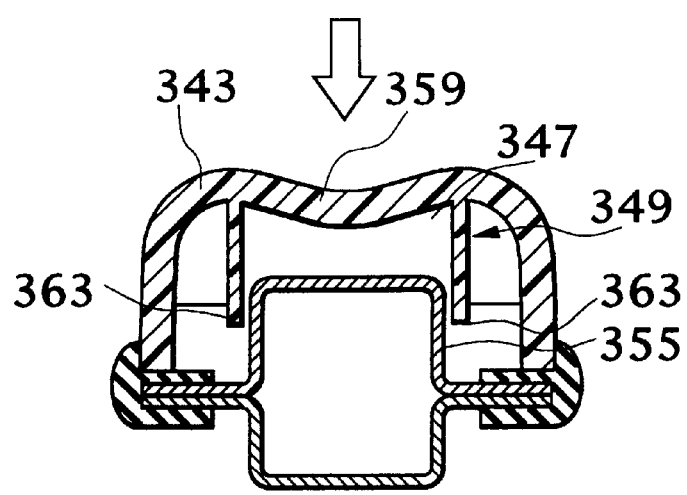
FIG. 26 is a sectional view showing a state wherein ribs of the front pillar garnish molding in FIG. 24 are caused to start buckling from the state shown in FIG. 24 according to the fifth embodiment of the present invention.

Then, as shown in FIG. 26, if the pressing impact load F1 is further applied to the molding main body 343 of the front pillar garnish molding 341, buckling 359 of the first ribs 347 of the ribs 345 is caused, the distance between the free edge portions 363, 363 of the second ribs 349, 349 is spread according to the corner portions 353, 353 of the front pillar inner panel 23.

Figure 27:
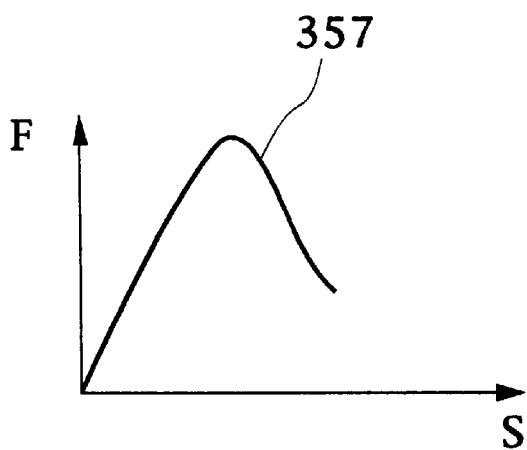
FIG. 27 is a characteristic view showing the correlation between the lapse time after impact has been made further on the front pillar garnish molding from the state in FIG. 26 and head impact deceleration according to the fifth embodiment of the present invention.

Subsequently, as shown in FIG. 27, since the second ribs 349, 349 of the ribs 345 of the pillar garnish molding 341 slide on the vertical side surfaces 355 of the front pillar inner panel 23 of the front pillar 3, the initial reaction 357 is attenuated.

Figure 28:
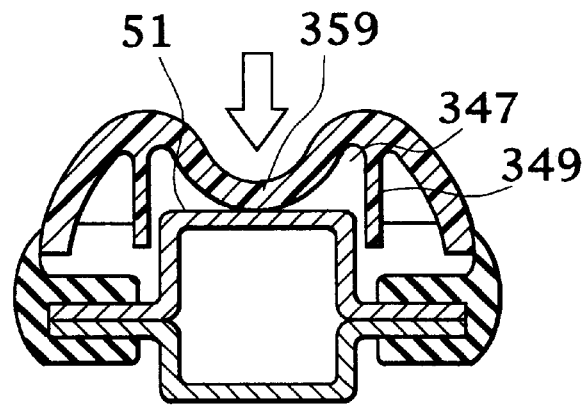
FIG. 28 is a sectional view showing a state wherein ribs of the front pillar garnish molding in FIG. 24 are caused to continue buckling from the state shown in FIG. 26 according to the fifth embodiment of the present invention.
Figure 29:
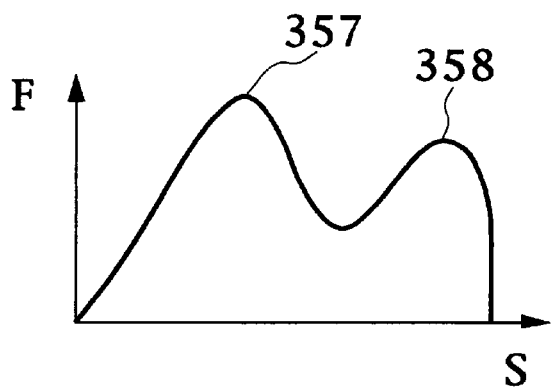
FIG. 29 is a characteristic view showing the correlation between the lapse time after impact has been made still further on the front pillar garnish molding from the state in FIG. 28 and head impact deceleration according to the fifth embodiment of the present invention.
Figure 30:
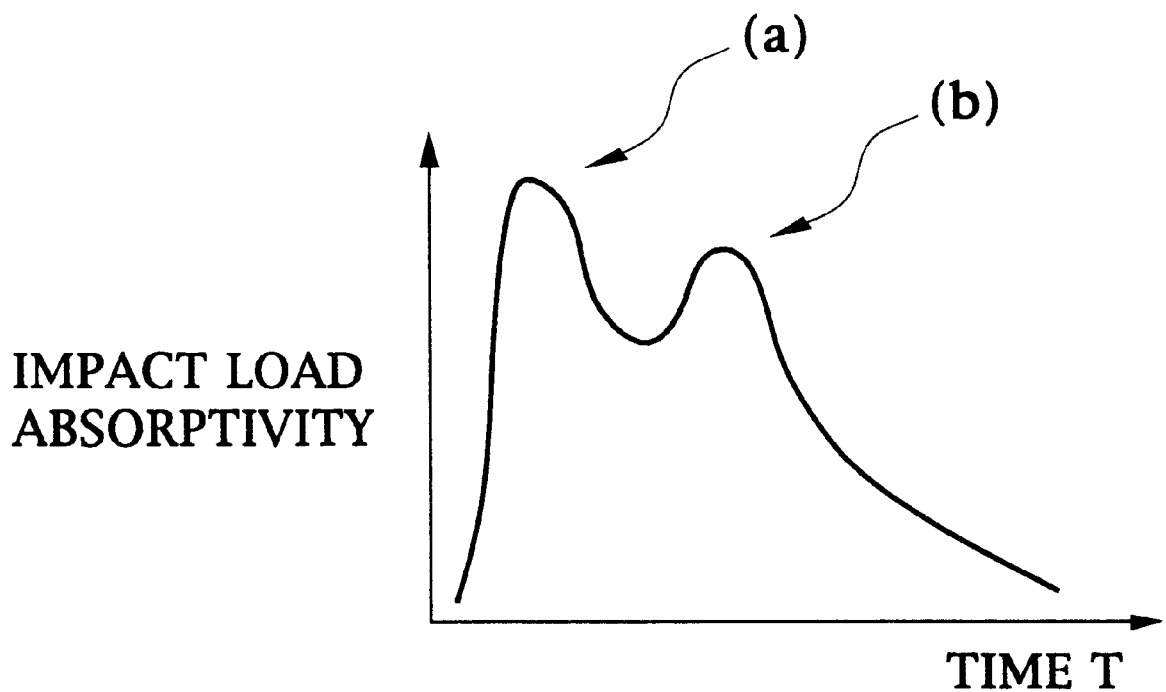
FIG. 30 is a characteristic view showing a correlation between a lapse time after impact has been made on the pillar garnish molding and head impact deceleration in the related art.

Further, as shown in FIG. 28, if the pressing impact load F1 is further applied, then buckling 359 of the molding main body 343 is caused. Therefore, since the molding main body 343 abuts on the cabin opposing surface portion 351 of the front pillar inner panel 23 (yield load is indicated by 358 in FIG. 29), two peaks appear in the energy absorption waveform of head impact deceleration G, as shown in FIG. 29. As a result, a crushing stroke of the pillar garnish molding 341 can be sufficiently assured.

Further, since a large stroke is not required for impact energy absorption, such a car body structure can be provided that a dimension of width of the center pillar 5 may be reduced.

Furthermore, a pressing impact load resistant value can be controlled as a design value by adjusting respective intervals between the first ribs 347, 347 and the second ribs 349, 349 of the ribs 345.

Since the second ribs 349 of the ribs 345 are formed so as to abut on the corner portions 353 of the front pillar inner panel 23 of the front pillar 3, the pillar garnish molding 341 can absorb the pressing impact load F1 effectively even if the pressing impact load F1 is applied from either front or rear direction against the pillar garnish molding 341.

As described above, the fourth embodiment of the present invention can achieve a practical advantage such that the car body structure can be provided which has improved energy absorption efficiency of head impact deceleration and is excellent in formability even if the width of the pillar panel is made small.

Various modifications will become possible for those skilled in the art after receiving the teachings of the present disclosure without departing from the scope thereof.

What is claimed is:

1. A car body structure comprising:
   a longitudinal pillar panel having a cabin opposing surface portion and vertical side surface portions, said cabin opposing surface portion arranged in opposition to a cabin of said car body, said vertical side surface portions being connected to said opposing surface portion via corner portions at a substantially right angle respectively; and
   a longitudinal pillar garnish molding made of synthetic resin and fitted to a cabin side of said pillar panel,
   wherein said pillar garnish molding comprises a molding main body with a pair of spaced apart integrally formed longitudinally extending ribs formed in one piece with said molding main body,
   wherein said molding main body is arranged in opposition to said pillar panel,
   wherein said ribs extend outwardly from a surface of said molding body toward said cabin opposing surface portion,
   wherein each of said ribs has a free edge portion and a base portion where the rib extends from the surface of the main molding body,
   wherein a distance between said free edge portions is less than a distance between base portions so that said ribs extend toward each other as said ribs extend outwardly from said molding main body,
   wherein said free edge portion is arranged in opposition to said corner portions so as to come in contact with said corner portion when a pressing load in a direction substantially perpendicular to said cabin opposing surface portion in excess of a predetermined value is applied to said molding main body, and
   wherein, when said pressing load in excess of said predetermined value is applied to said molding main body, the distance between said free edge portions increases to allow said ribs to slide on said vertical side surface portions of said pillar panel and permit said molding main body to contact said cabin opposing surface portion of said pillar panel to attenuate said pressing load.

2. A car body structure according to claim 1, wherein the distance between said free edge portions of said ribs is less than a distance between said corner portions.

* * * * *